No. 728,088. PATENTED MAY 12, 1903.
J. L. DILLON.
FLOWER BED.
APPLICATION FILED JUNE 21, 1902.
NO MODEL.

Witnesses
Edwin G. McKee
Chas. S. Hoyer

Inventor
John L. Dillon
By Victor J. Evans
Attorney

No. 728,088. Patented May 12, 1903.

UNITED STATES PATENT OFFICE.

JOHN LLOYD DILLON, OF BLOOMSBURG, PENNSYLVANIA.

FLOWER-BED.

SPECIFICATION forming part of Letters Patent No. 728,088, dated May 12, 1903.

Application filed June 21, 1902. Serial No. 112,655. (No model.)

*To all whom it may concern:*

Be it known that I, JOHN LLOYD DILLON, a citizen of the United States, residing at Bloomsburg, in the county of Columbia and State of Pennsylvania, have invented new and useful Improvements in Flower-Beds, of which the following is a specification.

This invention relates to a greenhouse or other flower-bed; and the object of the same is to provide a simple and effective device of this character whereby water or moisture may percolate or seep upwardly from the bottom toward the top thereof and thoroughly moisten a layer of soil at the top without the inconvenience and disadvantage arising from washing the soil away from plants located at the upper surface of the bed and also to encourage a stronger growth of plants by keeping an upper layer of soil in which they are rooted thoroughly permeated with water.

The invention consists in the construction and arrangement of the several parts, which will be more fully hereinafter described and claimed.

Figure 1:
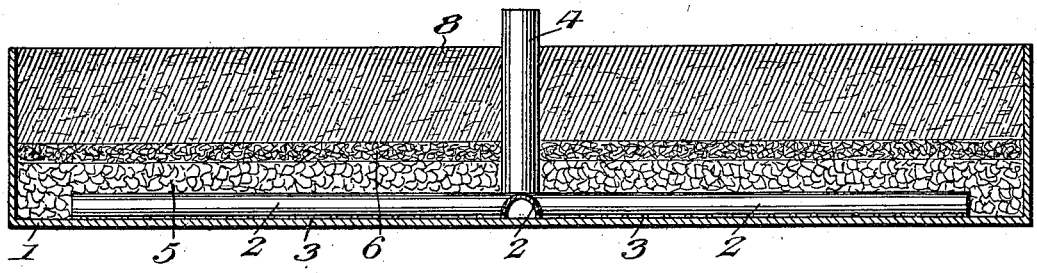
Figure 2:
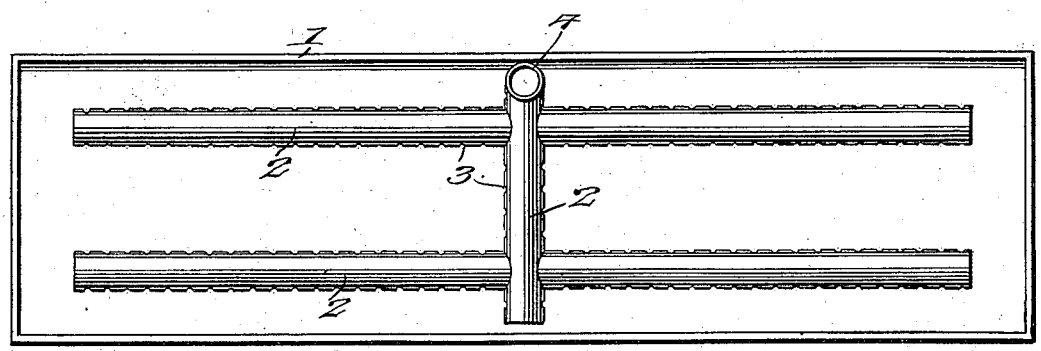
Figure 3:
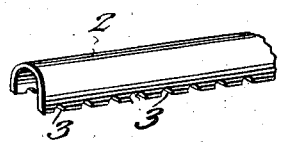

In the drawings, Figure 1 is a longitudinal vertical section of a flower-bed embodying the features of the invention and showing the layers of soil and other material therein. Fig. 2 is a top plan view of the improved bed, showing the layers of earth and other material removed. Fig. 3 is a detail perspective view of one of the feeders or sheds.

Similar numerals of reference are employed to indicate corresponding parts in the several views.

The numeral 1 designates an inclosure or casing for the improved bed, which has a suitable depth and will be formed of material best adapted for the purpose. Disposed at regular intervals on the upper side of the bottom of the inclosure or casing 1 are a series of inverted-U-shaped water feeders or sheds 2, having a plurality of openings or outlets 3 in the lower edges thereof. The feeders or sheds 2 are held closely in contact with the bottom of the inclosure or casing and comprise two longitudinally-extending members and a central transversely-extending member, an inlet-pipe 4 rising from one of the latter above the top of the flower-bed and adapted to be suitably connected to a water-supply.

Over the feeders or sheds 2 and resting on the bottom of the inclosure or casing 1 is a layer 5 of coarse coal-ashes, which completely covers the feeders or sheds 2 and has its upper surface at a distance above the highest points of said feeders or sheds. On the upper surface of the layer 5 of coarse coal-ashes a second layer 6 of finer coal-ashes is disposed and is of a less vertical extent than the layer 5. On top of the layer 6 a layer 8 of soil is arranged and extends completely through or flush with the upper edges of the sides and ends of the inclosure or casing. The depth of the layer 8 of soil will be regulated at will and in accordance with the size and strength of the plants disposed therein, as well as proportionate to the depth of the bed.

In the operation of the improved flower-bed the water is permitted to run through the pipe 4 and from the latter through the transverse member of the feeders or sheds and thence into the longitudinally-extending members of said feeders or sheds. The water passes out from the feeders or sheds at the bottom and percolates upwardly through the layer 5 of coarse coal-ashes and then through the layer 6 of finer coal-ashes and finally into the layer 8 of soil. The water will have comparatively little resistance in passing through the lower layer 5; but in view of the disposition of the feeders or sheds said layer will become thoroughly saturated. The layer of finer coal-ashes or the lower layer will become saturated from the latter, but will obstruct a forceful flow or percolation of water therethrough in view of its increased density relatively to that of the lower layer, and from the intermediate layer 6 the top layer 8 will become easily and gradually moistened without being disturbed by a strong upflow of the water, and the plants in the said top layer will thus be moistened or properly fed with water without displacing the roots of the same or weakening the support of the soil in relation thereto. After the layers have become thoroughly saturated the flow of water is cut off from the pipe 4, and in view of the lower layers 5 and 6 the layer 8 of soil on top thereof will be kept moist for a considerable length of time without requiring frequent repetition of the moistening operation.

The openings or outlets 3 of the feeders or sheds are of small diameter, and the water is permitted to pass outwardly through said openings in fine streams into the lower layer 5, and the disadvantages arising from the outlet of heavy gushing streams are avoided. Other advantages will appear from time to time to those using the improved device, and though a rectangular-shaped flower-bed is shown it will be understood that other forms may be equally well employed without departing from the principle of the invention.

Having thus fully described the invention, what is claimed as new is—

1. A flower-bed in which plants are to be directly placed and comprising an inclosure open at the top and having water-feeders on the bottom thereof, a layer of coarse coal-ashes disposed directly over the bottom of the inclosure on the said feeders, a layer of fine coal-ashes on the layer of coarse coal-ashes, and a top layer of soil on the fine coal-ashes whereby water will be caused to percolate evenly and thoroughly upwardly through the layers of ashes and gradually moisten the layer of soil.

2. A flower-bed comprising an inclosure having inverted-U-shaped feeders transversely disposed at regular intervals on the bottom, said feeders having small openings in the opposite side edges thereof close to the bottom of the bed and provided with a supply-pipe extending upwardly through the bed, and a bottom layer of coarse coal-ashes, an intermediate layer of finer coal-ashes, and a top layer of soil.

In testimony whereof I affix my signature in presence of two witnesses.

JOHN LLOYD DILLON.

Witnesses:
J. C. RUTTER, Jr.,
M. J. RUTTER.